United States Patent [19]

Buehrer et al.

[11] Patent Number: 4,678,145
[45] Date of Patent: Jul. 7, 1987

[54] REMOVABLE SLIDER FOR PARACHUTE DEPLOYMENT

[75] Inventors: Robert J. Buehrer, Whittier; William L. B. Gargano, Davis, both of Calif.

[73] Assignee: FXC Corporation, San Diego, Calif.

[21] Appl. No.: 759,609

[22] Filed: Jul. 26, 1985

[51] Int. Cl.4 .............................................. B64D 17/62
[52] U.S. Cl. ................................................... 244/152
[58] Field of Search .............. 244/142, 145, 147, 149, 244/151 B, 152

[56] References Cited

U.S. PATENT DOCUMENTS

| | | | |
|---|---|---|---|
| 1,771,261 | 7/1930 | Lendner | 244/142 |
| 3,756,547 | 9/1973 | Snyder et al. | 244/152 |
| 4,399,969 | 8/1983 | Gargano | 244/149 |
| 4,540,145 | 9/1985 | Matsuo | 244/152 |

FOREIGN PATENT DOCUMENTS 849309 11/1939 France ................................ 244/142
2514724 4/1983 France ................................ 244/142

OTHER PUBLICATIONS

Hand Drawn Sketch of "Split Slider", (FIGS. 1 and 2).

*Primary Examiner*—Jeffrey V. Nase
*Assistant Examiner*—Rodney Corl
*Attorney, Agent, or Firm*—Baker, Maxham & Jester

[57] ABSTRACT

A slider constructed of fabric is removably connected between the load suspension lines of a gliding parachute. During deployment of the parachute the slider moves longitudinally down the suspension lines to gradually restrain their transverse spreading. This slows down the inflation of the parachute and prevents dangerous explosive openings thereof. The slider is thereafter removed from the suspension lines in flight by pulling downward on a pair of handles to release tear away connectors. This reduces drag and makes the gliding action of the parachute quieter and more efficient.

13 Claims, 6 Drawing Figures

REMOVABLE SLIDER FOR PARACHUTE DEPLOYMENT

BACKGROUND OF THE INVENTION

The present invention relates to parachutes, and more particularly, to a slider which moves down the suspension lines of a gliding parachute to control the deployment thereof and which may be thereafter removed in flight to reduce drag and make the gliding action of the parachute quieter and more efficient.

For many years parachutes have been constructed by sewing a plurality of panels together to define a hemispherical structure when inflated. Some of these dome-like parachutes have incorporated slits, vents or baffles for controlling the flow of air therethrough, both to facilitate deployment and to provide maneuverability. However, these parachutes are adapted primarily for nearly vertical descent, and generally do not permit a load to be guided over substantial horizontal distances to a target landing area.

Recently, gliding parachutes have been developed for sport jumping, fire fighting, and military applications which can be readily manipulated to carry a load over a substantial distance. A typical gliding parachute is preformed and constrained in such a manner that when inflated it will define an airfoil in longitudinal section. When a load is suspended from this type of inflated parachute, the parachute will glide forwardly and its airfoil shape will provide the necessary lift. By controlling the peripheral edges of the gliding parachute, the parachute and the load can be guided in their path of descent to a target many miles away from the drop point.

Much emphasis has been placed on the fabric and rigging configurations of previous gliding parachutes in an effort to approximate, as close as possible, a conventional airfoil shape. This results in maximum lift for a given chute area which in turn provides the maximum glide ratio. In a multi-cell gliding parachute upper and lower fabric canopies are connected by laterally spaced fabric ribs. Suspension lines are connected at their upper ends to the parachute and converge downwardly to a harness or other load supporting structure.

U.S. Pat. No. 4,399,969 discloses a conventional slider arrangement for a gliding parachute. A plurality of suspension lines are connected at their upper ends to the main canopy and extend downwardly in a converging relationship to support the jumper. The lower ends of the suspension lines are connected to the upper ends of four fabric tape risers by connector links. The lower ends of the risers are in turn secured to a harness worn by the jumper. Four separate groups of the suspension lines are threaded through corresponding eyelets in the corners of a rigid, square piece of fabric called a slider. When the parachute is pulled from its deployment bag soon after the jumper leaves the airplane, the main canopy unfolds and begins to fill with air. The slider moves along the suspension lines from a position closer to the main canopy to a position adjacent the jumper's head, gradually restraining the spread of the suspension line as it slides downwardly. The slider thus controls inflation of the main canopy and prevents explosive openings thereof which could rupture fabric or stitching and subject the jumper to a dangerous, forceful jerk.

The conventional slider remains in a generally horizontal position above the head of the jumper as he or she glides through the air. Because of this the slider adds a significant amount of drag, thereby adversely affecting the glide ratio of the parachute. In addition the slider tends to exert forces on the suspension lines causing an undesirable amount of anhedral arc of the main canopy, which further adversely affects the glide ratio of the parachute. Finally, the slider tends to flap in the wind, thereby creating undesirable noise and vibration.

SUMMARY OF THE INVENTION

It is therefore the primary object of the present invention to provide an improved slider for a parachute.

It is another object of the present invention to provide a removable slider for a parachute.

It is another object of the present invention to provide a gliding parachute with a novel slider that may be removed to improve the glide ratio and make the parachute quieter as it glides to earth.

In the illustrated embodiment of the present invention a slider constructed of fabric is removably connected between the load suspension lines of a gliding parachute. During deployment of the parachute the slider moves longitudinally down the suspension lines to gradually restrain their transverse spreading. This slows down the inflation of the parachute and prevents dangerous explosive openings thereof. The slider is thereafter removed from the suspension lines in flight by pulling downward on a pair of handles to release tear away connectors. This reduces drag and makes the gliding action of the parachute quieter and more efficient.

DESCRIPTION OF THE PREFERRED EMBODIMENT

Figure 1:
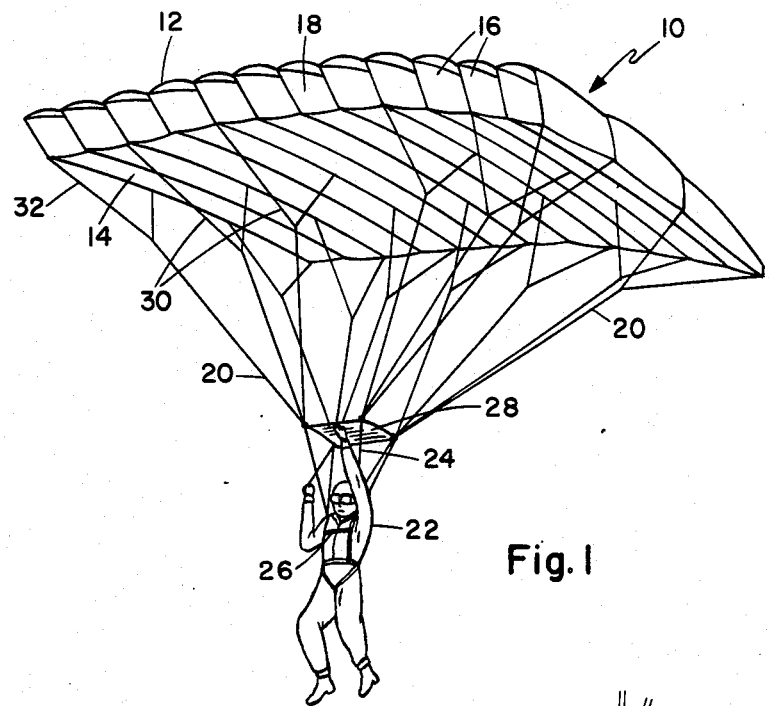
FIG. 1 is a perspective view of an inflated gliding parachute equipped with the removable slider of the present invention.

Referring to FIG. 1, the subject invention is primarily adapted for use in a multi-cell gliding parachute 10. Such a parachute includes upper and lower aligned, rectanglar fabric canopies 12 and 14. The canopies are conneced to one another by a plurality of vertically extending airfoil-shaped fabric ribs 16. The ribs extend across the canopies at spaced locations to define a plurality of cells 18. The upper canopy 12 is connected to the upper edge of each of the ribs 16. Similarly the lower canopy 14 is connected to the lower edge of each of the ribs. As the wing glides forwardly, air flows through each of the cells 18 to sustain the airfoil cross-section of the parachute.

A plurality of longitudinally extending suspension lines 20 (FIG. 1) are connected to the parachute or fabric wing 10 and converge downwardly to support a load in the form of a jumper 22. The lower portions of the suspension lines include four risers 24. The upper rope portions of of the suspension lines are attached to the upper ends of the risers 24 by connector links (not illustrated). The lower ends of the risers 24 are in turn secured to harness 26 worn by the jumper 22. Four separate groups of the suspension lines are transversely restrained by a square slider 28 generally denoted by reference numeral 28. During deployment of the parachute, the slider 28 moves downwardly over the suspension lines until it reaches the position illustrated in FIG. 1, directly over the jumper's head. The slider thus controls inflation of the parachute and prevents dangerous explosive openings thereof. The slider 28 is thereafter removed during flight.

The upper portions of the suspension lines include pairs of cascade lines 30 (FIG. 1) whose upper ends are connected to the ribs 16 through the lower canopy 14 as hereafter described in greater detail. A plurality of control lines 32 may be manually operated by the jumper 22 by pulling on toggles (not visible in FIG. 1) to deform the trailing edges of the parachute to permit steering and modification of the angle of attack of the parachute. The various lines may be made of suitable lightweight, strong rope, such as 450-700 pound test line made of material sold under the trademarks DACRON or KEVLAR.

Further details of the general construction of the gliding parachute 10 may be found in U. S. Pat. No. 4,399,969 of Gargano, the entire disclosure of which is incorporated herein by reference.

Figure 2:
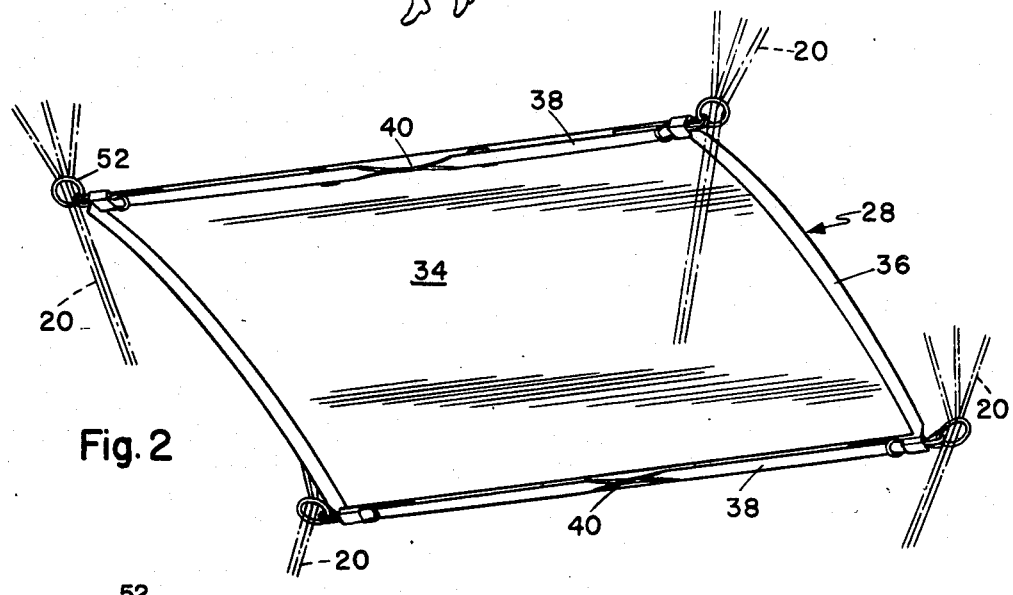
FIG. 2 is an enlarged perspective view of the preferred embodiment of the removable slider.
Figure 4:
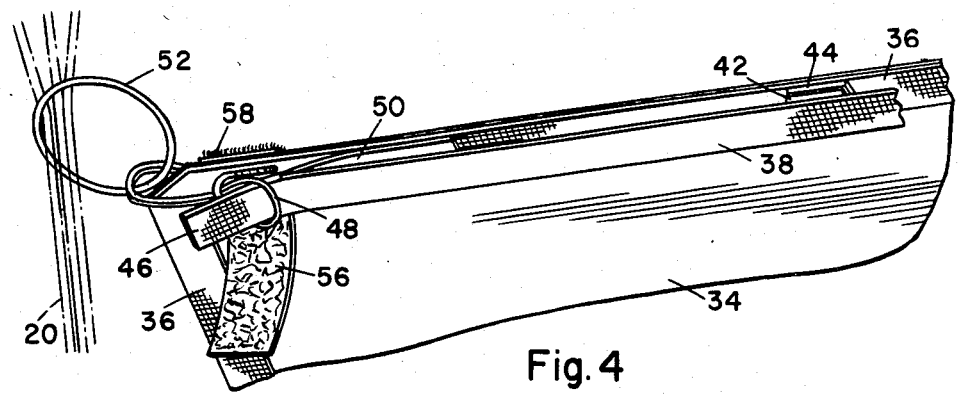
FIG. 4 is a further enlarged, perspective view of one corner of the slider of FIG. 2 with the retainer band released.
Figure 5:
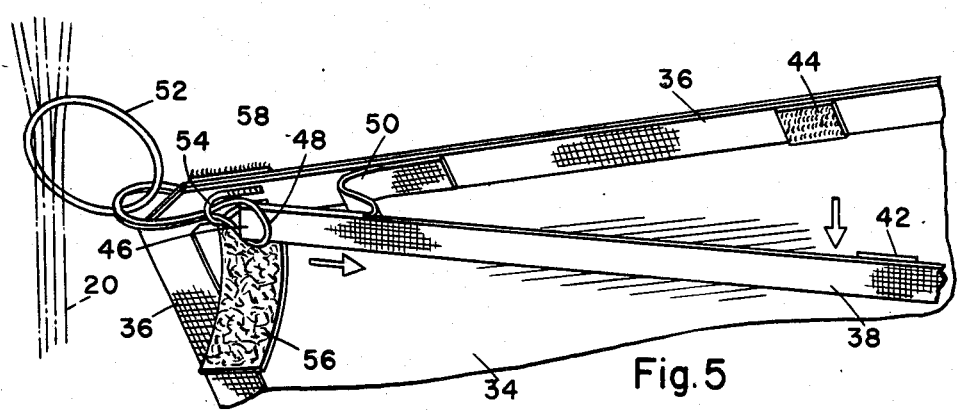
FIG. 5 is a view similar to FIG. 4 with the strap partially withdrawn from the loop.
Figure 6:
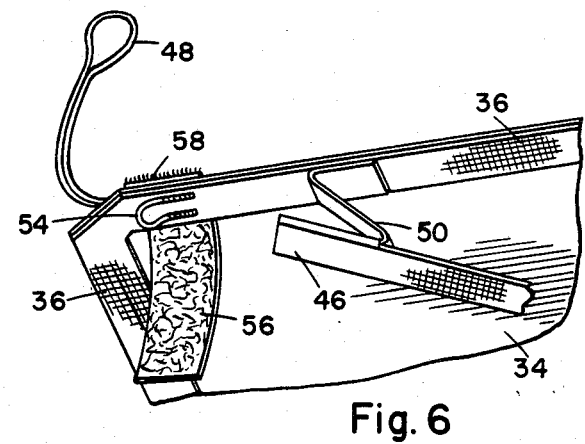
FIG. 6 is a view similar to FIG. 5 with the loop free and the slider ring released.

Referring to FIG. 2, the slider 28 includes a rectangular fabric panel 34 woven of a suitably strong material such as that sold under the trademark NYLON. A hem 36 in the form of a fabric tape woven of a similar material is stitched on top of all four side edges of the panel 34. A pair of straps 38 also made of a similar tape extend over the hem 36 along the front and rear edges of the panel 34, respectively. The straps 38 each have an intermediate handle portion 40. Each side of each handle is releasably connected to its corresponding portion of the hem 36 by mating hook weave fabric squares 42 and 44 (FIG. 5) made of a material such as that sold under the trademark Velcro. The terminal end portion 46 (FIG. 4) of each strap is reinforced, such as by stitching, to provide adequate stiffness for ready insertion into a corresponding attachment loop 48 (FIGS. 4-6) of rope whose terminal ends are stitched to the hem 36 and panel 34. The terminal end portions 46 of the straps are formed by folding over the fabric tape so as to leave end segments such as 50 (FIG. 5) at each end of the straps. These end segments are stitched to the hem 36 several inches from the corresponding corner of the fabric panel 34. Thus the terminal end portions 46 may be pulled out of their corresponding attachment loops 48 by pulling on the handle portions away from the panel 34 to detach the mating pairs of the hook weave fabric squares 42 and 44 as illustrated in the sequence of FIGS. 4-6.

A metal slider ring 52 (FIGS. 2-4) surrounds each of the four sets of suspension lines 20. In connecting the removable slider 28 as a unit to the parachute, each of the attachment loops 48 at each corner of the panel 34 is threaded through a corresponding slider ring 52 as best seen in FIG. 5. Each attachment loop 48 is then threaded through a corresponding retainer loop 54 whose ends are stitched to the hem 36. The terminal end portions 46 of each strap are then inserted through both corresponding attachment loops 48. A retainer band 56 (FIGS. 3 and 5) at each corner of the panel 34 is then wrapped around each assembled combination of loops 48 and 54 and terminal end portion 46. Preferably each retainer band is made of one type of mating hook weave fabric and its loose end is fastened to a square section 58 (FIG. 4) of the other type of such fabric which is stitched to the other side of the panel 34 over the ends of the attachment loop 48.

Figure 3:
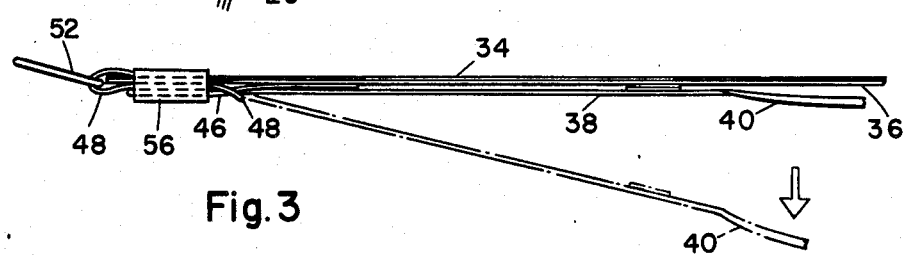
FIG. 3 is a front edge view of one corner of the slider of FIG. 2.

The operation of the removable slider is as follows. The slider is connected to the rings 52 as just described and as illustrated in FIG. 3. The mating hook weave fabric sections 42 and 44 at each end of each handle 40 are connected so that the straps 38 are held up against the panel 34 as illustrated in FIG. 2. Before the parachute is folded and stuffed into the deployment bag (not illustrated) the slider is pushed upward so that the rings 52 and the slider 28 are located at the junction of the suspension lines 20 and the cascade lines 30 as illustrated in FIG. 2. When the jumper leaves the airplane and pulls the rip cord the fabric canopies 12 and 14 are inflated in a rapid, but smooth fashion, owing to the damping action of the slider 28 as the rings 52, connected by the panel 34 slide downwardly along the suspension lines until the panel is just above the jumper's head, as illustrated in FIG. 1. The removably connection means in the form of the terminal end portions 46, loops 48 and retainer bands 56 are not released by lateral forces exerted by the suspension lines as the canopies strain to inflate and spread.

While just beginning the controlled forward and gradual downward glide of the inflated parachute, the jumper reaches up and pulls downwardly, first on one of the handles 40, and then on the other. As each handle is initially pulled downwardly, the associated retainer bands 56 release as illustrated in FIG. 4. Further pulling then pulls the terminal end portions 46 of the associated strap out of the attachment loops 48 as illustrated in FIG. 5. Still further downward pulling on the handle causes the attachment loop to pull out of the associated retainer loop 54 and ring 52 as illustrated in FIG. 6. Thus, the removable connection means release when pulled in a generally longitudinal direction. When the jumper pulls downwardly on the second handle, he or she holds onto this handle since the slider 28 is then completely detached from the rings 52 and the suspension lines 20. The jumper then folds up the slider 28 and stuffs it into his or her deployment bag.

The removal of the slider 28 eliminate the noise and vibration that would otherwise be induced by the vigorous flapping of the fabric panel 34. It also eliminates a major source of drag, thereby improving the glide ratio of the inflated parachute and the lateral distance that can be covered during the controlled gliding descent. Removal of the slider also reduces the lateral arc in the canopies which is illustrated in FIG. 1. This gives the inflated ram air wing a truer airfoil shape, which not only improves lift but results in enhanced maneuverability and control. This results from the elimination of the restriction on the suspension lines otherwise imposed by the idle slider before it is removed. The removal of the slider also permits the shape and performance of the ram air wing to be observed close up, either by the jumper looking upwards, or by a camera mounted to the jumper's helmet or back.

Having described a preferred embodiment of the removable slider, it should be apparent to those skilled in the art that the invention may be modified in both arrangement and detail. Therefore, the protection afforded the invention should only be limited in accordance with the scope of the following claims.

We claim:
1. In combination,
a parachite having a canopy and a plurality of longitudinally extending suspension lines;
means for restraining the suspension lines to control the rate of inflation of the canopy during the deployment thereof;
removing means for permitting a jumper supported by the canopy via the suspension lines to separate the restraining means from the parachute during descent; and
the restraining means including a rectangular fabric panel connected to a plurality of rings at spaced locations about the panel by the removing means, at least one of the suspension lines extending through each of the rings.

2. The combination of claim 1 wherein the rings slide along the suspension lines during inflation of the canopy.

3. The combination of claim 1 wherein the removing means includes at least one tear away connection which releases when pulled in a generally longitudinal direction.

4. The combination of claim 1 wherein the removing means includes a plurality of tear away connections each associated with a portion of the suspension lines and including a loop having a first end permanently connected to the panel and a second end threaded through a corresponding ring, and means for holding the second end of the loop and releasable upon longitudinal pulling thereof but not under lateral forces applied by the suspension lines during inflation of the canopy.

5. In combination,
a parachute having a canopy and a plurality of longitudinally extending suspension lines; and
manually releasable means for restraning the suspension lines to control the rate of inflation of the canopy during the deployment thereof, including a panel, a pluraltiy of rings each surrounding and slidable longitudinally over a corresponding set of the suspension lines, and a plurality of tear away connectors for coupling the panel to corresponding ones of the rings.

6. A slider for controlling the inflation of a parachute having a canopy and a plurality of longitudinally extending suspension lines, comprising:
a rectangular fabric panel;
a pair of straps;
means releasably holding the straps along a pair of opposite side edges of the panel so as to define a freely movable terminal end portion at each end of each of the straps;
a plurality of rings each surrounding and slidable longitudinally over a corresponding set of the suspension lines;
a plurality of attachment loops each secured to the panel and threadable through a corresponding one of the rings;
a plurality of retainer loops each connected to the panel for having a corresponding one of the attachment loops threaded therethrough;
a plurality of retainer bands each having a first end connected to the panel for surrounding a corresponding one of the attachment loops after it has been threaded through a corresponding one of the rings, threaded through a corresponding one of the retainer loops and then slid over the end of a corresponding one of the terminal end portions of the straps; and
means for releasably connecting a second end of each of the retainer bands to the panel to hold the corresponding joined attachment loop, retainer loop and terminal end portion until the straps are manually pulled away from the panel.

7. A slider according to claim 6 wherein the means for releasably holding the straps to the panel includes a plurality of pairs of mating hook weave fabric segments.

8. A slider according to claim 6 wherein each of the retainer bands is made of a first type of a mating hook weave fabric and the means for releasably connecting the second ends of the retainer bands includes a plurality of segments of a second type of the mating hook weave fabric.

9. A slider according to claim 6 wherein the straps each include intermediate handle portions.

10. In combination,
a parachute having a canopy and a plurality of longitudinally extending suspension lines;
means for restraining the suspension lines to control the rate of inflation of the canopy during the deployment thereof;
removing means for permitting a jumper supported by the canopy via the suspension lines to separate the retraining means from the parachute during descent; and
the removing means including a plurality of tear away connections each associated with a portion of the suspension lines, the tear away connections being transversely connected by the restraining means, each tear away and connection including a ring through which the portion of the suspension lines extend, a loop having a first end permanently connected to the restraining means and a second end threaded through the ring, and means for holding the second end of the loop and releasable upon longitudinal pulling thereof but not under lateral forces applied by the suspension lines during inflation of the canopy.

11. The combination of claim 10 wherein the restraining means slides along the suspension lines during inflation of the canopy.

12. The combination of claim 10 wherein the restraining means includes means for connecting the suspension lines generally transverse to their longitudinal extension.

13. The combination of claim 10 wherein the restraining means includes a rectangular fabric panel.

* * * * *